Feb. 23, 1932.  J. VOSS  1,846,166

ELASTIC SUSPENSION FOR ELECTRIC LAMPS AND THE LIKE

Filed Feb. 25, 1930

Patented Feb. 23, 1932

1,846,166

UNITED STATES PATENT OFFICE

JOHN VOSS, OF ALTONA-OSDORF, GERMANY

ELASTIC SUSPENSION FOR ELECTRIC LAMPS AND THE LIKE

Application filed February 25, 1930, Serial No. 431,216, and in Germany May 24, 1927.

Suspension devices for electric lamps are known, which are fixed to the covering and the relieving or the supporting thread of a conducting wire arranged thereunder for the purpose of protecting the conductor wires and their insulation against pull and thrust stresses and to prevent their becoming damaged. These known suspension devices consist of a cone provided with a cylindrical bore and designed to be pressed into a conically bored sleeve by means of a cap nut. In order to connect the known suspension devices to the conductor wire, the conductor wire is threaded through the cylindrical bore of the cone and the free end of the covering of the conductor and its relieving or supporting thread are bent back over the lower edge of the cone, whereupon the cone is pressed by a cap nut into the conically bored sleeve after the conductor leads have been threaded therethrough with their insulation, the covering and the relieving or supporting thread of the conductor wire arranged thereunder, being clamped between the superposed surfaces of the cones. The result is that the current conducting wires, together with their insulation are freed from pull or thrust stresses so that they are not loaded by the lamp socket with the lamp shade and bulbs and are not clamped between the cone and conical sleeve. These known suspension devices are however open to the objection that the covering and the relieving or supporting thread can be destroyed or crushed by the pressing together of the cone and conical sleeve so that a reliable relieving of the current conductor wires with their insulation is questionable.

The suspension device according to the invention, consisting of a suspension for electric lamps and the like which is fixed on the covering and on the relieving thread of the conductor arranged thereunder, differs from the known suspension devices by its particularly practical construction, the main features of which are that a metal sleeve ribbed on the outer side is inserted under the covering and relieving thread of the flexible cord and a rubber sleeve drawn thereover, which presses the covering and the relieving thread tightly against the metal sleeve at the tightening of a screw piece (nipple and cap nut).

This construction offers the considerable technical progress, that the parts of the flexible cord to be clamped namely the covering and the supporting thread lie protected between a rubber sleeve and a metal sleeve, so that they cannot be damaged by the pressure caused by the tightening of the screw piece. Consequently a reliable relieving of the current conducting wires, and insulating material is obtained besides an elastic resiliently acting connection between the lamp or the like and the flexible cord.

An embodiment of the invention is illustrated by way of example in the accompanying drawings in which.

Figure 1:
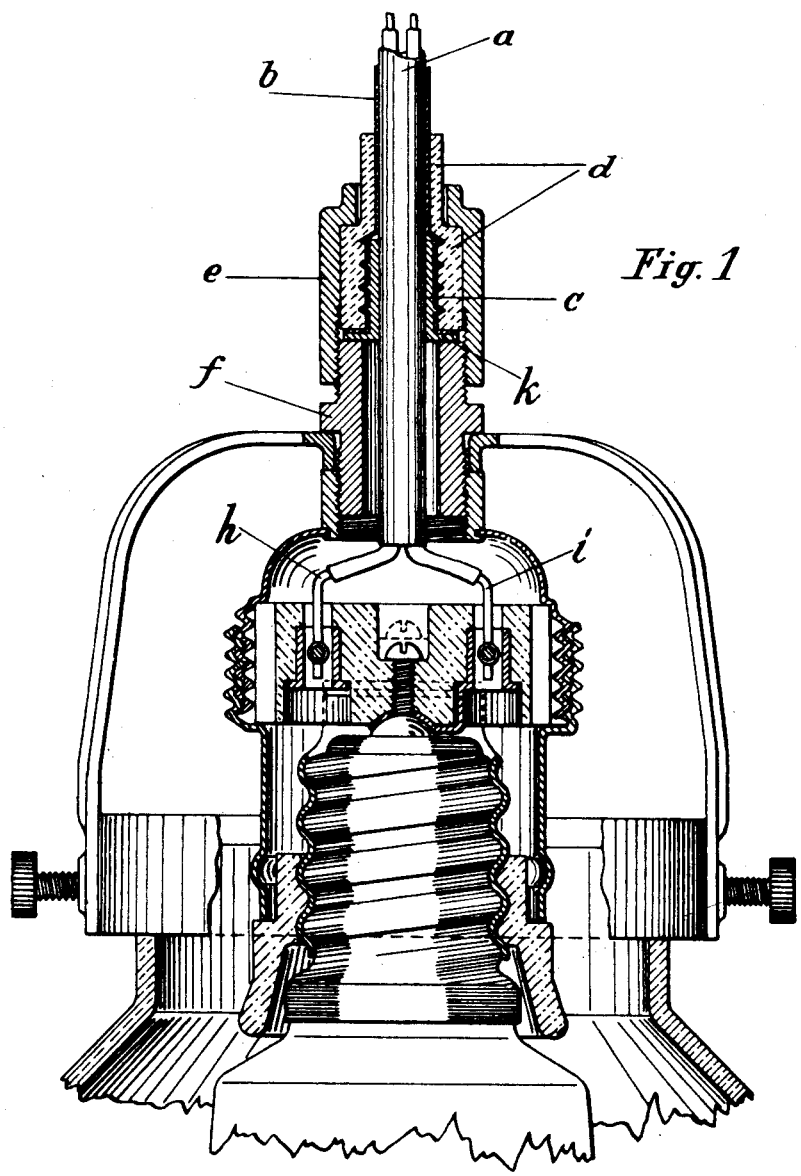
Fig. 1 shows the suspension in vertical section.
Figure 2:
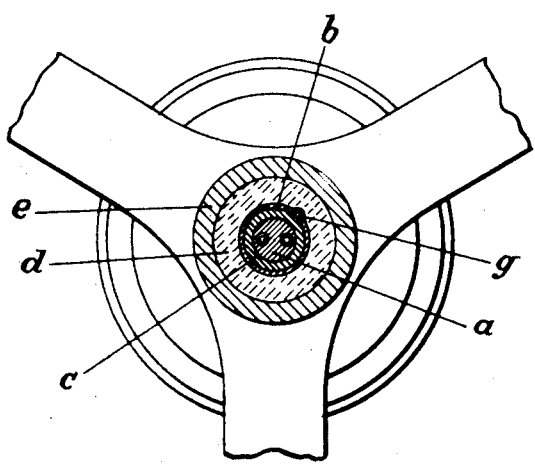
Fig. 2 is a cross section of the suspension.

The flexible cord consists of the current conducting wires $h$, $i$, which are embedded in an envelope $a$ of elastic material. The envelope $a$ is surrounded by a spun covering $b$. Between the covering $b$ and the envelope $a$ is a known relieving or supporting thread $g$. The covering $a$ is guided in a metal sleeve $c$ ribbed on the outer surface, which is pushed under the covering $b$ and the relieving thread $g$. The covering and relieving thread $g$ are enclosed by a rubber sleeve $d$, which is compressed by screw threaded clamping elements $e, f$. The free end of the covering $b$ and of the relieving thread $g$ are laid on the end face of the rubber sleeve $b$ and clamped by a flange $k$ of the metal sleeve $c$ when the screw threaded elements $e, f$ are tightened. Consequently the portion of the rubber sleeve $d$ in the screw threaded elements $e, f$ is compressed in axial direction and therefore bears tightly against the ribbed metal sleeve $c$ so that the ribs press into the rubber sleeve and consequently clamp the covering $b$ with relieving thread $g$ arranged over the metal sleeve $c$, so that it is impossible to pull off from the cable covering $a$ the rubber sleeve $d$ with the sleeve $c$ by exerting a pull onto the screw threaded elements $e, f$, in spite of the fact that the covering $e$ is freely movable and always free from pressure in the metal sleeve $c$ and in the part of the rubber sleeve $d$ projecting from the screw threaded element $e$.

I claim:

An elastic suspension devices for electric lamps and the like, comprising in combination with a covering and a relieving thread of the flexible cord under said covering, a metal sleeve ribbed on the outer surface adapted to be pushed under said covering and said relieving thread of said flexible cord, a rubber sleeve adapted to be slipped over said covering and said relieving thread, a tubular clamping element with external thread adapted to be attached at one end to the pendant and a second cap shaped clamping element adapted to be screwed onto the other end of said tubular element and to press said rubber sleeve, covering and relieving thread tightly against said metal sleeve.

In testimony whereof I affix my signature.

JOHN VOSS.